(12) United States Patent
Watanabe et al.

(10) Patent No.: US 11,002,552 B2
(45) Date of Patent: May 11, 2021

(54) MAP DATA GENERATION SYSTEM AND METHOD FOR GENERATING MAP DATA

(71) Applicant: Mitsubishi Electric Corporation, Chiyoda-ku (JP)

(72) Inventors: Masashi Watanabe, Tokyo (JP); Katsuyuki Kamei, Tokyo (JP); Hiroyuki Fujibayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 372 days.

(21) Appl. No.: 16/079,251

(22) PCT Filed: Jan. 6, 2017

(86) PCT No.: PCT/JP2017/000194
§ 371 (c)(1),
(2) Date: Aug. 23, 2018

(87) PCT Pub. No.: WO2017/175433
PCT Pub. Date: Oct. 12, 2017

(65) Prior Publication Data
US 2019/0063930 A1 Feb. 28, 2019

(30) Foreign Application Priority Data
Apr. 6, 2016 (JP) .............................. JP2016-076357

(51) Int. Cl.
*G01C 21/32* (2006.01)
*G01C 21/34* (2006.01)
(Continued)

(52) U.S. Cl.
CPC ............. *G01C 21/32* (2013.01); *G01C 21/34* (2013.01); *G06F 16/29* (2019.01); *G06T 11/60* (2013.01); *G09B 29/00* (2013.01)

(58) Field of Classification Search
CPC ......... G09B 29/00; G06T 11/60; G06F 16/29; G01C 21/32; G01C 21/34
See application file for complete search history.

(56) References Cited

U.S. PATENT DOCUMENTS

| 4,741,207 A | * | 5/1988 | Spangler ................ G01B 21/20 33/521 |
| 5,574,649 A | * | 11/1996 | Levy ....................... G01C 21/30 340/436 |

(Continued)

FOREIGN PATENT DOCUMENTS

| JP | 2002-221899 A | 8/2002 |
| JP | 2002-236444 A | 8/2002 |

(Continued)

OTHER PUBLICATIONS

International Search Report dated Mar. 14, 2017 in PCT/JP2017/000194 filed Jan. 6, 2017.

(Continued)

*Primary Examiner* — Stephen Holwerda
(74) *Attorney, Agent, or Firm* — Xsensus LLP

(57) ABSTRACT

A slope sample value at a sample point on a target route and a distance sample value from a reference point on the target route to the sample point are calculated based on three-dimensional position data of the target route. Undetermined elements contained in a model formula for the approximation formula representing relation between the slope sample value and the distance sample value are determined using an error evaluation formula for the model formula. The error evaluation formula contains a slope error evaluation component for evaluating a slope error between the slope sample value and a slope model value that is calculated using the model formula, and an altitude error evaluation component for evaluating an altitude error between an altitude model (Continued)

value that is obtained through integration of the slope model value and an altitude value that is obtained from the three-dimensional position data.

9 Claims, 5 Drawing Sheets

(51) Int. Cl.
    *G06F 16/29*         (2019.01)
    *G06T 11/60*         (2006.01)
    *G09B 29/00*         (2006.01)

(56) References Cited

U.S. PATENT DOCUMENTS

| | | | |
|---|---|---|---|
| 6,732,046 B1* | 5/2004 | Joshi | G01C 21/26 345/442 |
| 2003/0078720 A1 | 4/2003 | Adachi | |
| 2007/0129892 A1* | 6/2007 | Smartt | G01C 21/32 702/5 |
| 2007/0276576 A1* | 11/2007 | Inoue | B60T 7/122 701/80 |
| 2008/0183382 A1* | 7/2008 | Asai | G01C 21/32 701/414 |
| 2009/0299616 A1* | 12/2009 | Denaro | G01C 21/32 701/117 |
| 2013/0164712 A1* | 6/2013 | Hunt | G06F 17/00 434/65 |

FOREIGN PATENT DOCUMENTS

| | | |
|---|---|---|
| JP | 2004-45340 A | 2/2004 |
| JP | 2008-305340 A | 12/2008 |
| JP | 2010-266306 A | 11/2010 |
| JP | 2013-7889 A | 1/2013 |
| JP | 2013-40850 A | 2/2013 |
| JP | 2013-140246 A | 7/2013 |

OTHER PUBLICATIONS

Japanese Office Action dated Jun. 21, 2017 in Patent Application No. 2017-528974 (with English translation).

* cited by examiner

MAP DATA GENERATION SYSTEM AND METHOD FOR GENERATING MAP DATA

TECHNICAL FIELD

The present invention relates to a technology of generating map data.

BACKGROUND ART

In recent years, a mobile mapping system (MMS) has been increasingly used, which acquires three-dimensional point group information, such as a road surface and roadside equipment, simultaneously with traveling of a surveying vehicle. Note that, the surveying vehicle is equipped with surveying functions, such as a global positioning system (GPS) device, a laser radar, and a camera.

Acquired three-dimensional point group information as it is has a very large data volume, and thus processing of extracting only necessary pieces of information is performed. For example, as for an in-vehicle device, three-dimensional positions and three-dimensional shapes, such as a central position of a road (hereinafter also referred to as a "road center line"), a central position of each traffic lane on a road (hereinafter also referred to as a "traffic lane center line"), a sectioning line, and a traffic sign, are useful. Therefore, such pieces of information are extracted.

However, three-dimensional shape information such as the road center line may have a large data volume, necessitating a technology of compressing the three-dimensional shape information. As such a technology, there is known a technology of expressing the three-dimensional shape information using a function. For example, Patent Document 1 discloses a technology of expressing three-dimensional point group information using functions of an arc, a straight line, and a transition curve. The gist of the technology is as follows.

Firstly, a planar traveling locus, which is a locus in a horizontal plane, is generated from a three-dimensional traveling locus. Then, a control point of each curved part in the planar traveling locus is detected. The control point is a point of intersection between two straight parts set on both sides of the curved part. After that, a transition curve that smoothly connects to the arc and the straight part is detected. With this, the planar traveling locus is described using functions of the straight line, the arc, and the transition curve. Similar processing is performed also on a vertical traveling locus, which is a locus in a vertical plane.

PRIOR ART DOCUMENT

Patent Document

Patent Document 1: Japanese Patent Application Laid-Open No. 2010-266306

SUMMARY

Problem to be Solved by the Invention

An in-vehicle information device is considered to frequently use slope data. Patent Document 1, however, does not make reference to slope data. Since a function representing a vertical traveling locus is generated in Patent Document 1, it may be possible to obtain slope data from the function. However, precision of the slope data or the like is not taken into consideration when the function of the vertical traveling locus is generated.

An object of the present invention is to provide a technology capable of precisely calculating a value such as slope and of contributing to enhancement in a compression rate of map data.

Means to Solve the Problem

A map data generation system according to one aspect of the present invention includes a data converter and an approximation part. The data converter calculates, based on three-dimensional position data of shape forming points representing a three-dimensional shape of a target route, a slope sample value indicating slope at a sample point on the target route and a distance sample value indicating a distance from a reference point on the target route to the sample point. The approximation part generates an approximation formula representing relation between the slope sample values and the distance sample values by determining undetermined elements contained in a model formula that is prepared for an approximation formula. The slope sample values and the distance sample values are obtained at a plurality of sample points. More specifically, the approximation part determines the undetermined elements such that an error evaluation result obtained by using an error evaluation formula that is defined concerning the model formula falls within an allowable range. Here, the error evaluation formula contains a slope error evaluation component for evaluating a slope error between the slope sample value and a slope model value that is calculated using the model formula, and an altitude error evaluation component for evaluating an altitude error between an altitude model value that is obtained through integration of the slope model value and an altitude value that is obtained from the three-dimensional position data of the target route.

Effects of the Invention

According to the above-mentioned one aspect, the error evaluation formula contains a slope error evaluation component and an altitude error evaluation component. Therefore, an obtained approximation formula not only enables precise calculation of a slope value at an arbitrary point on the target route, but also enables precise calculation of an altitude value through integration of the calculated highly-precise slope value. Further, employment of the approximation formula enables reduction in data volume, as compared to the case where data of slope values and altitude values at a large number of locations are stored. This allows increase in a compression rate of map data.

The object, features, aspects, and advantages of the present invention will become more obvious with the following detailed description and attached drawings.

DESCRIPTION OF EMBODIMENTS

First Embodiment

<Configuration of Map Data Generation System>

Figure 1:
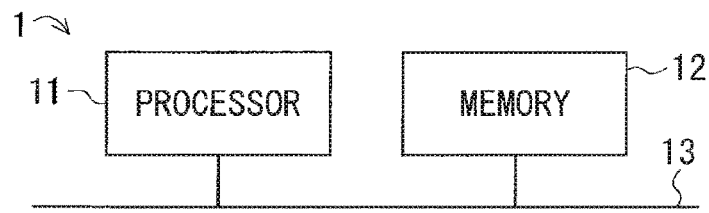
FIG. 1 is a hardware configuration diagram of a map data generation system according to first to third embodiments.

FIG. 1 is a hardware configuration diagram of a map data generation system 1 according to a first embodiment and also according to second and third embodiments to be described later. The map data generation system 1 is, for example, used by a business entity that generates map data. Alternatively, the map data generation system 1 is used by being incorporated into a navigation system installed in a movable body, such as an automobile.

According to the example of FIG. 1, the map data generation system 1 includes a processor 11 and memory 12, and the processor 11 and the memory 12 are connected via a bus 13. The memory 12 is made up of one or more storage devices. Examples of the storage device include semiconductor memory (such as read only memory (ROM), random access memory (RAM), rewritable non-volatile memory) and a hard disk (HD) device. The memory 12 may include both of semiconductor memory and a HD device.

According to the configuration of FIG. 1, the processor executes a program stored in the memory 12, thereby implementing various functions to be described later of the map data generation system 1. In other words, the map data generation system 1 is implemented by software.

Figure 2:
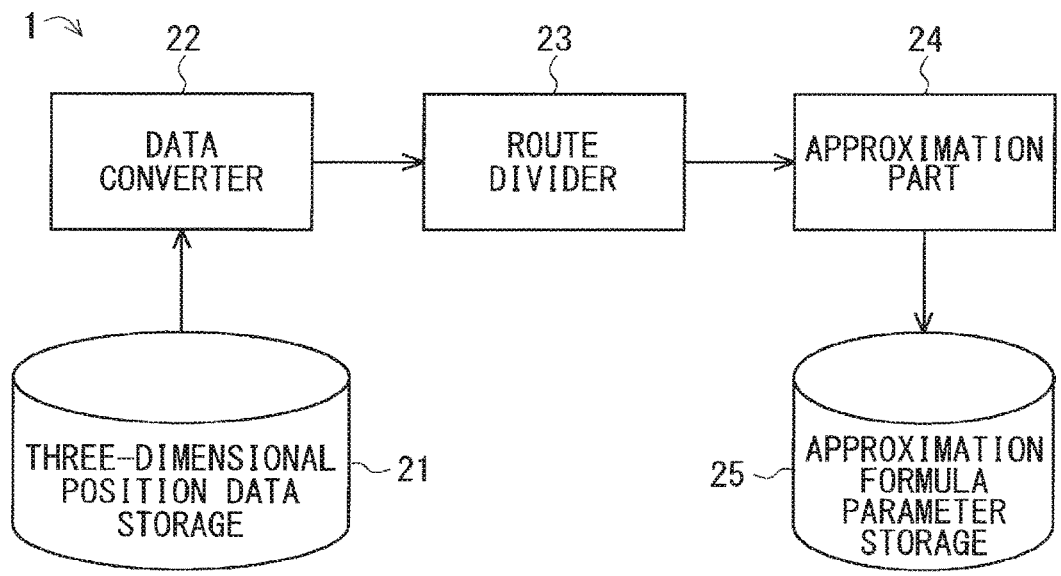
FIG. 2 is a functional block diagram of the map data generation system according to the first to third embodiments.

FIG. 2 is a functional block diagram of the map data generation system 1. According to the example of FIG. 2, the map data generation system 1 includes a three-dimensional position data storage 21, a data converter 22, a route divider 23, an approximation part 24, and an approximation formula parameter storage 25. The three-dimensional position data storage 21 and the approximation formula parameter storage 25 are implemented by the memory 12. The three-dimensional position data storage 21 and the approximation formula parameter storage 25 may be implemented by one storage device, or may be implemented by separate storage devices. As in the above, the processor executes a program, thereby implementing the functions of the data converter 22, the route divider 23, and the approximation part 24 by means of software.

<Three-Dimensional Position Data Storage 21>

The three-dimensional position data storage 21 stores data for identifying a three-dimensional shape of a route to be subjected to processing (hereinafter referred to as a target route). The description below is given of an example in which the target route is a road. However, the target route need not necessarily be a road, and may be a route designated by a user on a map, for example.

The three-dimensional shape of a road may be represented by sequentially connecting points set along the road with straight lines or the like. Referring to such points as shape forming points, the three-dimensional shape of a road may be represented by a series of shape forming points, i.e., a sequence of shape forming points. The sequence of shape forming points of a road is, for example, a sequence of points representing a road center line. Here, the three-dimensional position data storage 21 stores three-dimensional position data of a sequence of points representing a road center line.

A sequence of points of a road center line and three-dimensional position data of each point are acquired in advance with an already-known technology using a mobile mapping system (MMS), for example. Therefore, detailed description of a method of generating data of a road center line is omitted.

Note that, as a sequence of shape forming points of a road, another sequence of points (such as a sequence of points representing a traffic lane center line, a sectioning line, or a locus of movement of a surveying vehicle for MMS) may be used as well. Therefore, the three-dimensional position data storage 21 may store three-dimensional position data of another sequence of points.

The three-dimensional position data is made up of a set of three pieces of data, being latitude, longitude, and altitude. In this case, the altitude typically is an elevation, i.e., a height with reference to a mean sea level. However, the altitude may be determined with reference to a plane other than a mean sea level.

Alternatively, the three-dimensional position data may be made up of a set of three coordinate values of X, Y, and Z on the basis of an XYZ coordinate system being an orthogonal coordinate system. Note that, the XYZ coordinate system is defined in such a manner that a location specified by predetermined latitude, longitude, and altitude is set as the origin, and coordinate axes of X, Y, and Z are set in predetermined directions from the origin. Here, the Z-axis is set in a gravity direction from the origin, and in such a case, a Z-coordinate value represents altitude.

More specifically, the three-dimensional position data storage 21 stores data of a plurality of routes, and provides the data converter 22 with data of a target route that is specified by the data converter 22 among the plurality of routes.

<Data Converter 22>

The data converter 22 acquires, from the three-dimensional position data storage 21, three-dimensional position data of a sequence of shape forming points representing the three-dimensional shape of a target route. The target route is, for example, specified by sequentially selecting a plurality of routes. Alternatively, an operator may specify the target route. Alternatively, when the map data generation system 1 is incorporated into a navigation system, a road in which an automobile installed with the navigation system travels may be set as the target route. Note that, a road in which an automobile is currently traveling may be specified by detecting a current position of the automobile with a GPS device or the like and then collating the detected current position with map data.

Based on the acquired three-dimensional position data, the data converter 22 calculates a slope sample value indicating slope at a sample point on the target route. Further, based on the acquired three-dimensional position data, the data converter 22 also calculates a distance sample value indicating a distance on the target route from a reference point to the sample point.

The description below is given of an example in which the reference point is a shape forming point located at one end in the sequence of shape forming points of the target route. In this case, the reference point may be referred to as a starting point, and a shape forming point located at the other end as an end point. Note that, when the map data generation system 1 is incorporated into a navigation system, the starting point and the end point are set such that a direction from the starting point toward the end point matches a moving direction. However, the setting of the reference point is not limited to these examples.

Further, a sequence of shape forming points of a target route contains an N-number of shape forming points A, and an n-th shape forming point counted from the starting point is hereinafter referred to as $A_n$. Note that, N is a positive integer, and n is an integer of 1 or more and N or less. In this case, the starting point is $A_1$, and the end point is $A_N$.

The sample point is set in an interval between two consecutive shape forming points. That is, within an interval from a shape forming point $A_k$ to the next shape forming point $A_{k+1}$, a k-th sample point $B_k$ counted from the side of the starting point $A_1$ is set. Note that, k is an integer of 1 or more and N−1 or less. The description is herein given of an example in which the sample point $B_k$ is set as an intermediate point between the shape forming points $A_k$ and $A_{k+1}$. In this case, a distance sample value $l_k$ indicating a distance from the starting point $A_1$ to the sample point $B_k$ is calculated using the formula (1) below.

[Formula 1]

$$l_k = \frac{d_{k+1} + d_k}{2} \quad (1)$$

Here, $d_k$ represents a distance from the starting point $A_1$ to the shape forming point $A_k$. The distance $d_k$ is calculated by adding up a distance between two consecutive shape forming points from the starting point $A_1$ to the shape forming point $A_k$. Specifically, the distance $d_k$ is calculated using the formula (2) below, where $d_{i,i+1}$ represents a distance between the shape forming points $A_i$ and $A_{i+1}$.

[Formula 2]

$$d_k = \sum_{i=1}^{k-1} d_{i,i+1} \quad (2)$$

Further, the distance $d_{i,i+1}$ between the shape forming points $A_i$ and $A_{i+1}$ is calculated using the formula (3) below, where $(x_i, y_i, z_i)$ represents three-dimensional position data of the shape forming point $A_i$ in the XYZ coordinate system.

[Formula 3]

$$d_{i,i+1} = \sqrt{(x_i - x_{i+1})^2 + (y_i - y_{i+1})^2 + (z_i - z_{i+1})^2} \quad (3)$$

Note that, even when three-dimensional position data of the shape forming point $A_i$ is made up of pieces of data of latitude, longitude, and altitude, such three-dimensional position data may be converted into three-dimensional position data $(x_i, y_i, z_i)$ of the XYZ coordinate system by an already-known converting method.

Meanwhile, a slope sample value $s_k$ indicating slope at the sample point $B_k$ is calculated using the formula (4) below. Note that, $z_k$ represents an altitude value of the shape forming point $A_k$.

[Formula 4]

$$s_k = \frac{z_{k+1} - z_k}{d_{k+1} - d_k} \quad (4)$$

According to the formula (4), the slope sample value $s_k$ at the sample point $B_k$ is defined as a mean slope value between the shape forming points $A_k$ and $A_{k+1}$. Note that, according to the formula (1) as in the above, the sample point $B_k$ is defined as an intermediate point between the shape forming points $A_k$ and $A_{k+1}$, and the distance sample value $l_k$ at the sample point $B_k$ is defined as a distance from the starting point $A_1$ to the intermediate point between the shape forming points $A_k$ and $A_{k+1}$. However, other definitions may be applied to the sample point $B_k$, the slope sample value $s_k$, and the distance sample value $l_k$.

In the following, two-dimensional data $(l_k, s_k)$ collectively indicating the distance sample value $l_k$ and the slope sample value $s_k$ concerning one sample point $B_k$ may be referred to as sample point data $DB_k$. Refer to the formula (5) below.

[Formula 5]

$$DB_k = (l_k, s_k) = \left(\frac{d_{k+1} + d_k}{2}, \frac{z_{k+1} - z_k}{d_{k+1} - d_k}\right) \quad (5)$$

<Route Divider 23>

The route divider 23 acquires, from the data converter 22, sample point data $DB_1$ to $DB_{N-1}$ at all of the sample points on the target route. Then, based on the sample point data $DB_1$ to $DB_{N-1}$, the route divider 23 divides the target route. With this, a sequence of shape forming points and a sequence of sample points are divided.

FIG. 3 to FIG. 6 are each a conceptual diagram of route dividing processing performed by the route divider 23. FIG. 3 to FIG. 6 show a coordinate system with its horizontal axis representing a distance 1 from the starting point $A_1$ and vertical axis representing slope s, in which the sample point data $DB_1$ to $DB_{N-1}$ are plotted with black dots. Further, FIG. 7 is a flowchart of the route dividing processing.

Figure 3:
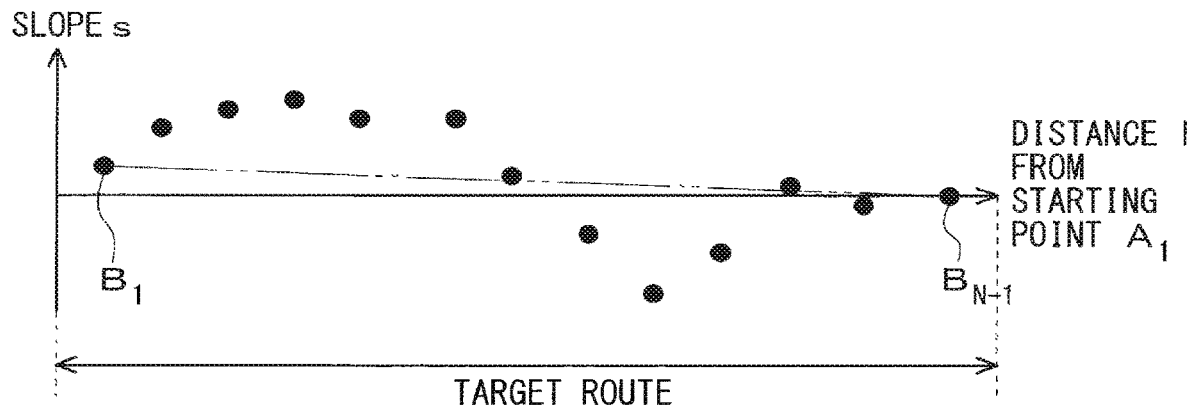
FIG. 3 is a conceptual diagram of route dividing processing.
Figure 4:
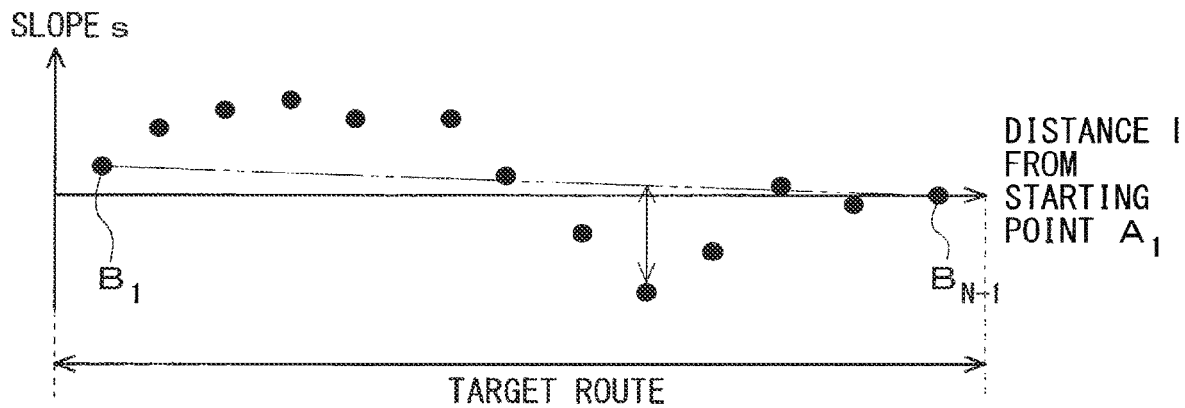
FIG. 4 is a conceptual diagram of the route dividing processing.
Figure 5:
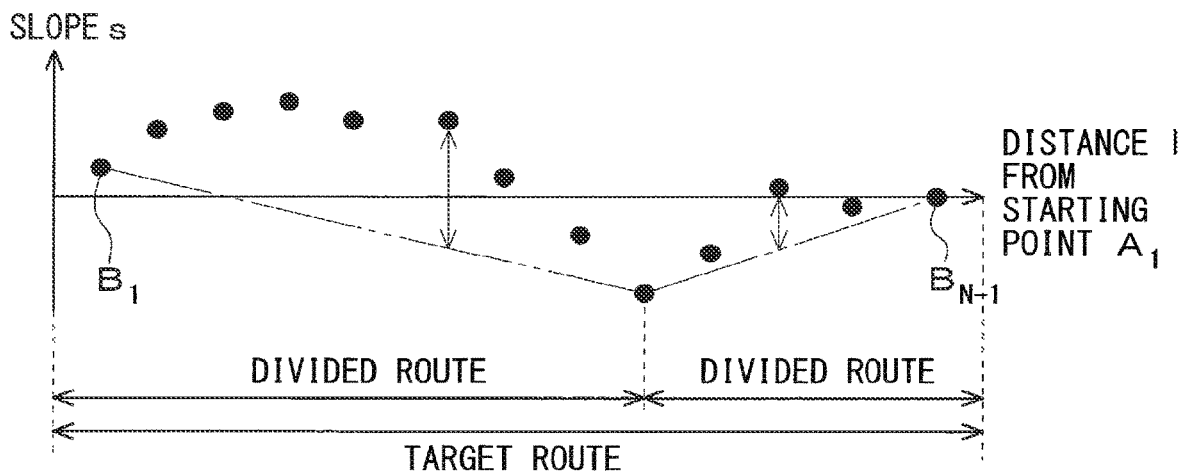
FIG. 5 is a conceptual diagram of the route dividing processing.

Firstly, as shown in FIG. 3, the entire target route is set as a candidate route for division (refer to Step ST11 of FIG. 7), and the sample points B located at both ends in the candidate route for division are connected with a straight line (refer to Step ST12). Note that, this straight line is hereinafter referred to as a provisional straight line.

Next, examination is made whether or not a distance (distance along the vertical axis) between each of the sample points B contained in the candidate route for division and the provisional straight line is less than a predetermined distance ε (refer to Step ST13). For example, ε is 0.05 radians. When all of the sample points B contained in the candidate route for division are located at positions less than the predetermined distance ε from the provisional straight line, the route dividing processing ST10 is ended.

In contrast, when sample points located at or farther than the predetermined distance ε from the provisional straight line are found, a sample point B among the found sample points B that is farthest from the provisional straight line is set as a division point. After that, the current candidate route for division is divided at the division point to thereby set two new candidate routes for division, and Step ST12 of the above is executed on each of the new candidate routes for division (refer to Step ST14, and FIG. 5). Note that, the division point belongs to both of the new candidate routes for division.

Figure 6:
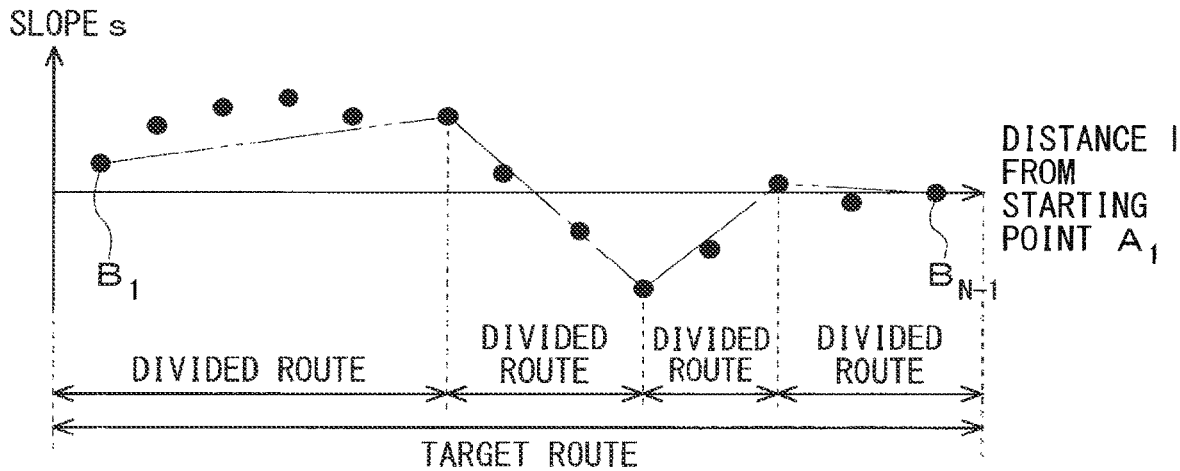
FIG. 6 is a conceptual diagram of the route dividing processing.
Figure 7:
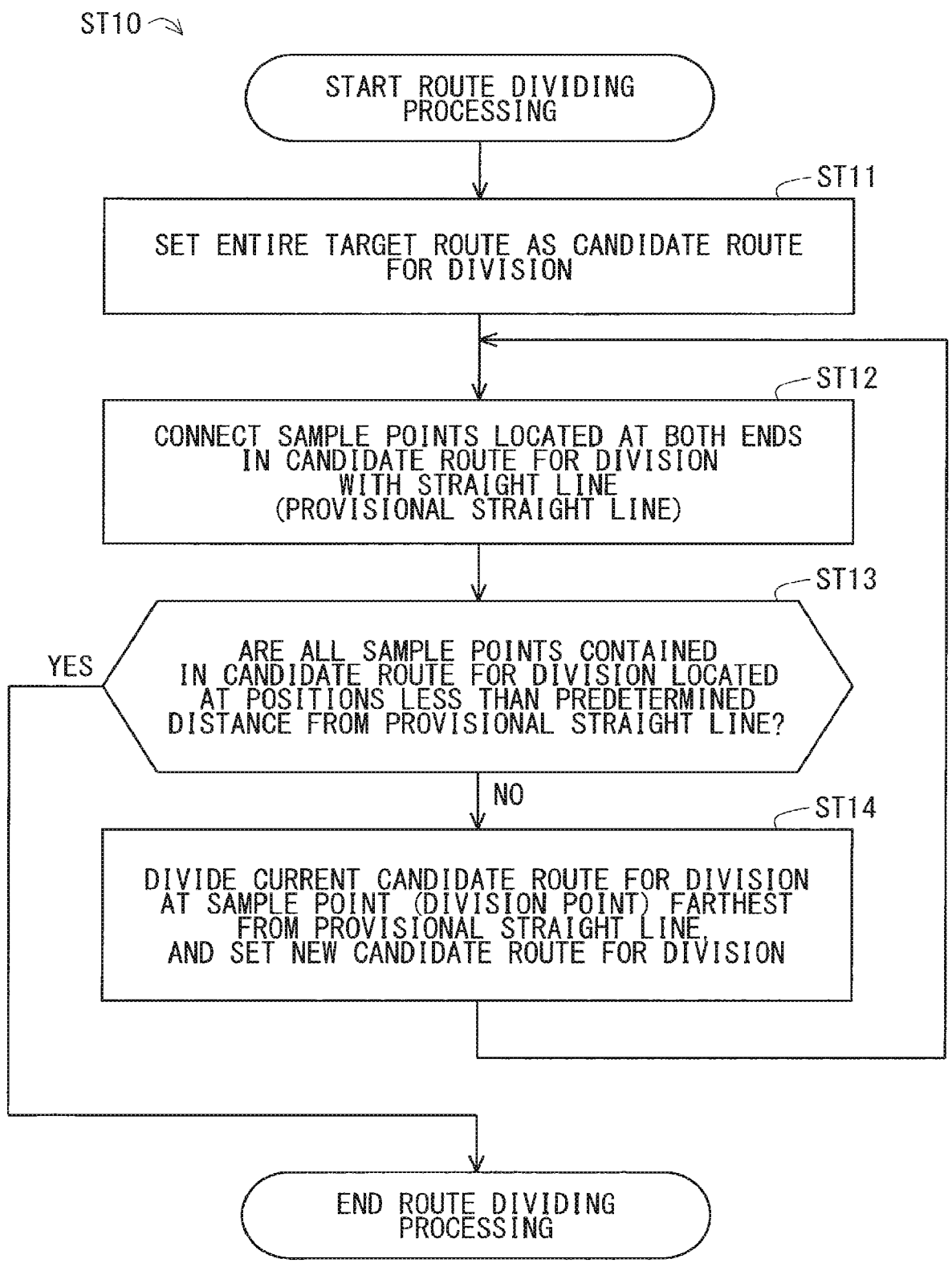
FIG. 7 is a flowchart of the route dividing processing.

According to the route dividing processing ST10, a candidate route for division is divided until no new division points are founded anymore, and each candidate route for division obtained at the end is set as a divided route (refer to FIG. 6).

Note that, in Steps ST13 and ST14, a division point may be sought by extracting a sample point B having the largest distance from the provisional straight line and then comparing the distance with the predetermined distance ε.

When the target route is divided, the route divider 23 outputs data of a sequence of sample points and a sequence of shape forming points in the unit of a divided route. In contrast, when the target route is not divided, the route divider 23 outputs data of a sequence of sample points and a sequence of shape forming points of the entire target route.

Further description will later be given of the route divider 23.

<Approximation Part 24>

The approximation part 24 acquires, from the route divider 23, the data of a sequence of sample points and a sequence of shape forming points. Then, based on the acquired data, the approximation part 24 generates an approximation formula representing relation between the slope sample value and the distance sample value.

Here, when the target route is divided by the route divider 23, the approximation part 24 generates an approximation formula for each divided route. In contrast, when the target route is not divided by the route divider 23, the approximation part 24 generates one approximation formula for the entire target route. The entire target route and each divided route are hereinafter referred to as an interval to be approximated. That is, the approximation part 24 generates one approximation formula for one interval to be approximated.

The approximation part 24 determines undetermined elements contained in a model formula that is prepared for an approximation formula, thereby generating an approximation formula. The description is herein given of an example in which the approximation formula representing relation between the slope sample value and the distance sample value is a linear function. In this case, a model formula for an approximation formula is expressed as the formula (6) below.

[Formula 6]

$$s = al + b \quad (6)$$

In the formula (6), s represents slope, and l represents a distance from the starting point $A_1$. The formula (6) contains a and b as undetermined elements. When a and b are determined, the formula (6) is uniquely determined. The determined formula is the approximation formula.

Processing of the approximation part 24 is configured based on a concept of determining undetermined elements such that an error evaluation result obtained by using an error evaluation formula that is defined concerning the model formula (6) falls within an allowable range. Firstly, an error evaluation formula Q is defined with the formula (7) below, and $\Sigma\Delta s^2$ and $\Sigma\Delta z^2$ in the error evaluation formula Q are respectively defined in the formulas (8) and (9) below.

[Formula 7]

$$Q = \Sigma \Delta s^2 + w \Sigma \Delta z^2 \quad (7)$$

[Formula 8]

$$\Sigma \Delta s^2 = \sum_{k=b_i}^{b_f} (al_k + b - s_k)^2 \quad (8)$$

[Formula 9]

$$\Sigma \Delta z^2 = \sum_{k=a_i}^{a_f} \left( \frac{1}{2} a d_k^2 + b d_k + z_1 - z_k \right)^2 \quad (9)$$

$\Sigma\Delta s^2$ in the formula (8) represents the sum of squares of a slope error $\Delta s$. According to the formula (8), an error between a slope sample value $s_k$ at a sample point $B_k$ and a slope model value $al_k + b$ is used as the slope error $\Delta s$. The slope model value $al_k + b$ is a value calculated by substituting a distance sample value $l_k$ at the same sample point $B_k$ into the model formula (6). Note that, in the formula (8), $b_i$ and $b_f$ represent the numbers of sample points B at both ends in the interval to be approximated. For example, when the interval to be approximated is the entire target route, $b_i=1$ and $b_f=N-1$.

$\Sigma\Delta z^2$ in the formula (9) is based on the formula (10) below that is obtained by integrating the model formula (6). In the formula (10), z represents an altitude value, and $z_1$ represents an altitude value at the starting point $A_1$. (Note than, altitude is obtained through integration of slope, and conversely, slope is obtained through differentiation of altitude.)

[Formula 10]

$$z = \frac{1}{2} a l^2 + b l + z_1 \quad (10)$$

With reference to the formula (1), $\Sigma\Delta z^2$ in the formula (9) represents the sum of squares of an altitude error $\Delta z$. According to the formula (9), an error between an altitude value $z_k$ at a shape forming point $A_k$ and an altitude model value $ad_k^2/2 + bd_k + z_1$ is used as the altitude error $\Delta z$. The altitude model value $ad_k^2/2 + bd_k + z_1$ is a value calculated by substituting a distance $d_k$ between the same shape forming point $A_k$ and the starting point $A_1$ into the model formula (10). Note that, in the formula (9), $a_i$ and $a_f$ represent the numbers of shape forming points A at both ends in the interval to be approximated. For example, when the interval to be approximated is the entire target route, $a_i=1$ and $a_f=N$.

In the error evaluation formula Q of the formula (7), the term of $\Sigma\Delta z^2$ is multiplied by a weight coefficient w. For example, when w=1, the slope error and the altitude error are equally evaluated. Further, when w<1 (for example, w=0.2), evaluation may be carried out such that the slope error is reduced. Conversely, when w>1, evaluation may be carried out such that the altitude error is reduced. For example, if the user is allowed to change the value of the weight coefficient w, the user may adjust the error evaluation. In contrast, the value of the weight coefficient w may be an unchangeable fixed value.

Note that, it is possible not to employ the weight coefficient w. In such a case, the error evaluation formula Q is expressed exclusively by the formula (11) below.

[Formula 11]

$$Q = \Sigma \Delta s^2 + \Sigma \Delta z^2 \qquad (11)$$

Here, in the error evaluation formulas Q of the formula (7) and the formula (11), $\Sigma \Delta s^2$ represents an example of a slope error evaluation component for evaluating, at each of the sample points B, a slope error between a slope sample value and a slope model value that is calculated using the model formula. Further, $\Sigma \Delta z^2$ represents an example of an altitude error evaluation component for evaluating, at each of the shape forming points A, an altitude error between an altitude model value that is obtained through integration of a slope model value and an altitude value that is obtained from the above three-dimensional position data concerning the target route. That is, the error evaluation formulas Q of the formula (7) and the formula (11) contain a slope error evaluation component and an altitude error evaluation component.

Further, in the error evaluation formula Q of the formula (7), w represents a weight component for adjusting proportion of influence of the slope error evaluation component over the error evaluation result and influence of the altitude error evaluation component over the error evaluation result. That is, the error evaluation formula Q of the formula (7) further contains such a weight component as in the above.

Incidentally, the error evaluation formula Q of the formula (7) is a function having a and b as variables. More specifically, Q is a quadratic function concerning a, and also is a quadratic function concerning b. Further, a coefficient of the term of $a^2$ and the term of $b^2$ is positive. Therefore, with a and b that satisfy the formula (12), the value of Q (i.e., the error evaluation result) is minimum. The same holds true for the error evaluation formula Q of the formula (11) as well.

[Formula 12]

$$\left. \begin{array}{l} \frac{\delta Q}{\delta a} = 0 \\ \frac{\delta Q}{\delta b} = 0 \end{array} \right\} \qquad (12)$$

In view of the above, a numerical formula for determining a and b that satisfy the formula (12) is provided to the approximation part 24 in advance, and the approximation part 24 calculates a and b using the numerical formula. With this, the undetermined elements (i.e., a and b) contained in the model formula (6) are determined, whereby the approximation formula is determined.

The approximation part 24 saves, in the approximation formula parameter storage 25, an approximation formula parameter being a parameter for specifying an approximation formula. The approximation formula parameter is, for example, defined based on determined details of the undetermined elements (i.e., values of a and b in the above) of the model formula and an effective range of the approximation formula. Alternatively, when there are a plurality of intervals to be approximated, the approximation formula parameter may be defined based on a group of pieces of data of two-dimensional coordinates at a point of intersection between approximated straight lines of adjacent intervals to be approximated. Note that, the approximation formula, i.e., the approximation formula parameter, defines part of the map data.

Here, the values of a and b calculated by the approximation part 24 may not match a mathematically-calculated precise theoretical value due to significant figures in arithmetic, for example. However, even if the values of a and b contain such an arithmetical error, the obtained approximation formula is considered to be effective. That is, usefulness of the approximation formula is secured through determination of undetermined elements of the model formula such that the error evaluation result obtained by using the error evaluation formula Q falls within an allowable range (a range that may be regarded to be a substantially minimum value).

In the above, description has been given of an example in which the approximation formula is a linear function. However, a function showing a curved line, such as an arc and a quadratic function, may be employed as the approximation formula.

Incidentally, when the approximation formula is a linear function, an approximate line represented by the approximation formula is a straight line. Therefore, in the route dividing processing ST10 (refer to FIG. 7), a provisional straight line having the same form as the approximate line is used. That is, in the route dividing processing, the target route is divided using a provisional line having the same form as the approximate line. In view of this, the route dividing processing may be generalized as follows.

The route dividing processing is processing of dividing a target route into a plurality of divided routes so as to satisfy a predetermined requirement. Particularly, the predetermined requirement is a requirement that, at all of the sample points contained in the divided route, an error between a provisional slope model value (i.e., a slope value obtained by substituting a distance sample value into a provisional model formula (to be described later)) and its corresponding slope sample value (i.e., a slope sample value associated with the distance sample value that is substituted into the provisional model formula) falls within a predetermined range. Note that, the predetermined range concerning the error is, in the above example, a range less than the predetermined distance ε. Here, the provisional model formula is a formula in which undetermined elements of the model formula are set such that the above error becomes zero at the sample points at both ends contained in the divided route.

<Operational Sequence>

Figure 8:
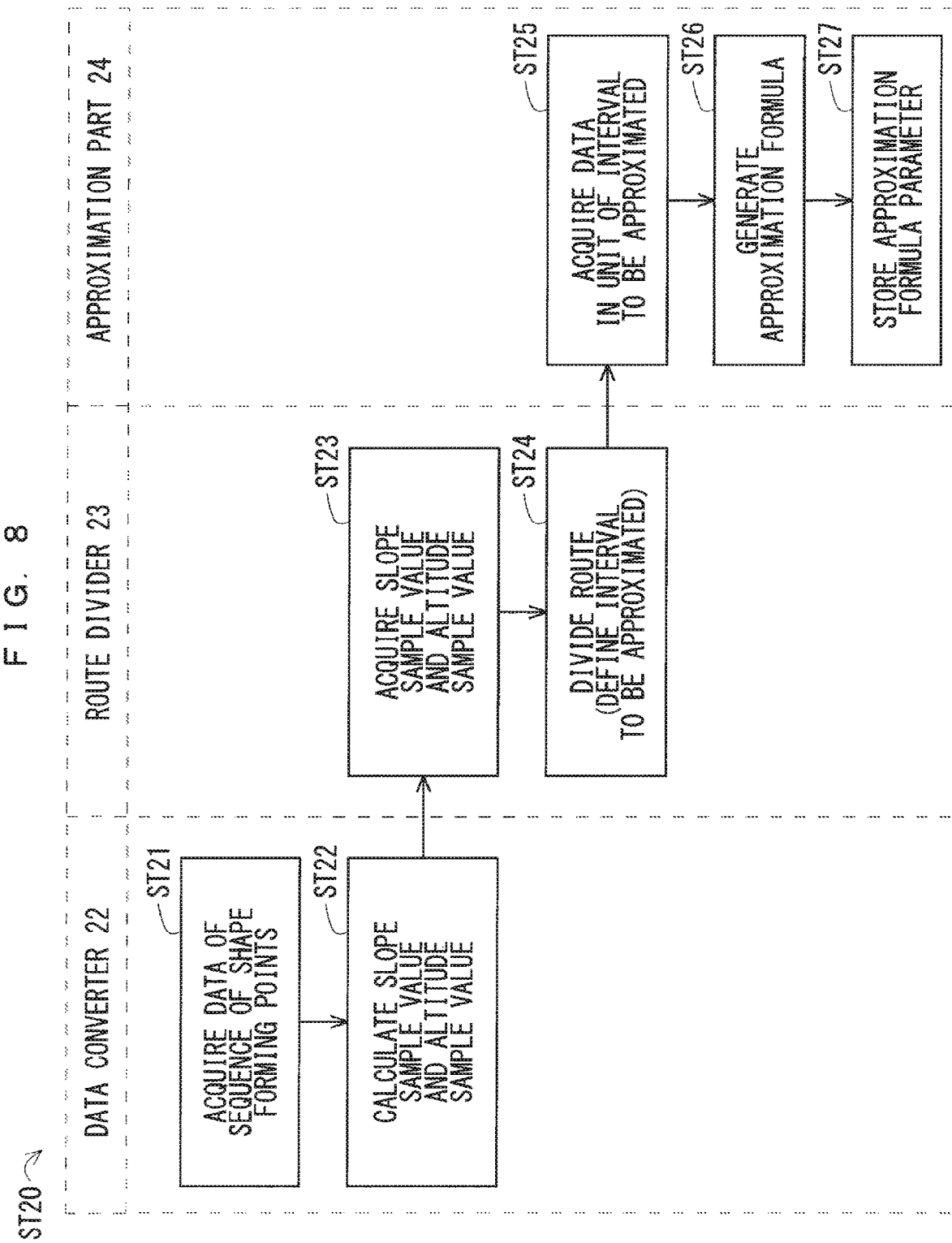
FIG. 8 is an operational sequence diagram of the map data generation system.

FIG. 8 is an operational sequence diagram of the map data generation system 1. According to the operational sequence ST20 of FIG. 8, in Step ST21, the data converter 22 acquires, from the three-dimensional position data storage 21, three-dimensional position data of a sequence of shape forming points representing the three-dimensional shape of a target route. Then, in Step ST22, based on the acquired three-dimensional position data, the data converter 22 calculates a slope sample value and a distance sample value at sample points on the target route.

Next, in Step ST23, the route divider 23 acquires the above data generated by the data converter 22. Then, in Step ST24, the route divider 23 divides, if necessary, the target route based on the acquired data. As a result, an interval to be approximated is defined.

Next, in Step ST25, the approximation part 24 acquires, from the route divider 23, data of a sequence of sample points and a sequence of shape forming points in the unit of an interval to be approximated that is defined by the route divider 23. Then, in Step ST26, based on the acquired data, the approximation part 24 generates an approximation formula representing relation between the slope sample value and the distance sample value. Then, in Step ST27, the approximation part 24 stores an approximation formula parameter in the approximation formula parameter storage 25.

<Effects>

According to the map data generation system 1, the error evaluation formula Q (refer to the formula (7) and the formula (11)) contains the slope error evaluation component (refer to $\Sigma\Delta s^2$) and the altitude error evaluation component (refer to $\Sigma\Delta z^2$). Therefore, the obtained approximation formula not only enables precise calculation of a slope value at an arbitrary point on the target route, but also enables precise calculation of an altitude value through integration of the calculated highly-precise slope value.

Further, employment of the approximation formula enables reduction in data volume, as compared to the case where data of slope values and altitude values at a large number of locations are stored. This allows increase in the compression rate of the map data.

Further, the error evaluation formula Q of the formula (7) contains the weight coefficient w. Therefore, proportion of influence of the slope error evaluation component and the altitude error evaluation component over the error evaluation result may be adjusted.

Second Embodiment

The slope data is, for example, used for an early estimation of the amount of regenerative electric power in an electric vehicle and a hybrid vehicle. If the amount of regenerative electric power is understood in advance, a possible travel distance may be accurately calculated. Further, how to achieve the most efficient traveling may be determined by determining intervals to be traveled with gasoline and intervals to be traveled with electric power.

Regenerative electric power is generated only when a braking operation is performed intensely exceeding a certain degree of intensity. Thus, estimation of regenerative electric power is carried out for an interval having such downward slope that is larger than a certain reference slope value. Therefore, an approximation formula for calculating a slope value is required to have high calculation precision in such an interval.

In view of the above, in the second embodiment, the formula (13) below is used as the error evaluation formula Q. Note that, the configuration and the operation of the map data generation system 1 according to the second embodiment are basically similar to those of the first embodiment.

[Formula 13]

$$Q = \sum_{k=b_i}^{b_f} (a1_k + b - s_k)^2 \times F(s_k) \qquad (13)$$

Particularly, F(s) in the formula (13) is defined in the formula (14) below, for example.

[Formula 14]

$$F(s) = \begin{cases} 5 & (\text{If } s < -0.05) \\ 1 & (\text{If } s \geq -0.05) \end{cases} \qquad (14)$$

According to the formula (13) and the formula (14), when a slope value s is less than a reference slope value (−0.05 radians in the example of the formula (14)), weight on the slope error $\Delta s$ (more specifically, a squared value $\Delta s^2$ thereof) is relatively increased. Conversely, when the slope value s is equal to or more than the reference slope value, weight on the slope error $\Delta s$ is relatively reduced. With this, strict evaluation is made on the slope error $\Delta s$ in downward slope that is larger than the reference slope value (more specifically, an absolute value thereof). As a result, an approximation formula capable of precisely calculating downward slope that is larger than the reference slope value may be obtained.

Note that, the definition of F(s) is not limited to the above example. For example, a value for s is divided into three or more ranges, and a value of F(s) is assigned for each of the ranges. In such a case, the values of F(s) may be different in all of the ranges, or the values of F(s) may be the same in a part of the ranges. That is, three or more types of values may be assigned for F(s).

Here, the term on the right side of the formula (13) represents an example of a slope error evaluation component for evaluating, at each of the sample points B, a slope error between a slope sample value and a slope model value that is calculated using the model formula. Further, F(s) represents an example of a weight component for changing weight on the slope error in accordance with information concerning the sample point B. Here, the information concerning the sample point B is the slope sample value. A weight component for changing a value of weight as in the above is hereinafter referred to as an active weight component. That is, the slope error evaluation component of the formula (13) contains an active weight component. Employment of the active weight component allows increase in precision of approximation in a particular location or interval within the target route.

Further, employment of the approximation formula enables reduction in data volume, as compared to the case where data of slope values and altitude values at a large number of locations are stored. This allows increase in the compression rate of the map data.

The altitude error evaluation component may be added to the error evaluation formula Q of the formula (13). Refer to the formula (15) below. Note that, $\Sigma\Delta z^2$ in the formula (15) is defined in the formula (9) already described in the above.

[Formula 15]

$$Q = \sum_{k=b_i}^{b_f} (a1_k + b - s_k)^2 \times F(s_k) + w\Sigma\Delta z^2 \qquad (15)$$

In place of $w\Sigma\Delta z^2$ in the formula (15), $\Sigma\Delta z^2$ may be employed similarly to the formula (11).

When the error evaluation formula Q also contains the altitude error evaluation component, the effects similar to those of the first embodiment are obtained.

Incidentally, the active weight may be applied to the route division as well. That is, the route divider 23 changes the width of the above predetermined range for evaluating the error between a provisional slope model value and a slope sample value in accordance with information concerning the sample point B. Here, the information concerning the sample point B is the slope sample value. Specifically, it is only necessary to change the value of ε, which defines the width of the predetermined range, in accordance with the slope sample value. Alternatively, ε may be multiplied by an active weight component, and the active weight component may be changed.

For example, the width of the above predetermined range is set to 0.01 radians when the slope sample value $s_k$ is less than −0.05 radians, and the width of the above predetermined range is set to 0.03 radians when the slope sample value $s_k$ is −0.05 radians or more. This allows intervals having downward slope that is larger than a reference slope value (here, 0.05 radians) to be finely divided, relatively shortening intervals to be approximated. As for such short intervals, highly precise approximation formulas may be obtained. In contrast, intervals other than the above are more roughly divided, relatively reducing the number of intervals to be approximated. As a result, the number of approximation formulas, that is, data volume of approximation formula parameters, is reduced, allowing increase in the compression rate of the map data.

Third Embodiment

The slope data is, for example, used for estimation of a current position of a subject vehicle (hereinafter also referred to as a subject vehicle position). Specifically, the subject vehicle position may be specified on a map by comparing slope of a road (that is contained in map data) and inclination of the subject vehicle (that is measured by an inclination sensor or the like). In this case, the subject vehicle position may be accurately specified on condition that the slope value and the inclination value are accurate.

Note that, with use of a GPS device, a map matching technology (a technology of correcting the subject vehicle position on the basis of a general fact that an automobile should travel on a road, for example), etc., the subject vehicle position may be in many cases accurately estimated without use of the slope data. However, it is difficult to detect the subject vehicle position using a GPS device when the circumstance of GPS reception is not good (in a tunnel, for example). Further, when the subject vehicle travels in a long straight road, it is difficult to correct the subject vehicle position into an extending direction of the road using the map matching technology.

Accordingly, under the circumstance where a GPS device and a map matching technology are unavailable, a technology of estimating the subject vehicle position using the slope data is useful.

In view of the above, in the third embodiment, the formula (16) below is used as the error evaluation formula Q. Note that, the configuration and the operation of the map data generation system 1 according to the third embodiment are basically similar to those of the first embodiment.

[Formula 16]

$$Q = \sum_{k=b_i}^{b_f} (al_k + b - s_k)^2 \times G_k \quad (16)$$

Particularly, a value of $G_K$ in the formula (16) changes in accordance with circumstantial information at a sample point $B_K$. Note that, $G_K$ represents a positive number.

The circumstantial information at the sample point $B_K$ is, for example, information concerning the circumstance of GPS reception. For example, $G_K=1$ is set when the circumstance of GPS reception is good, and $G_K=5$ is set when the circumstance of GPS reception is not good. More specifically, when there is no obstacle in the entire region of the range in the sky at an angle of elevation of 45° or higher, it is determined to be a good circumstance for GPS reception. In contrast, a location as in a tunnel where GPS radio waves do not arrive is determined to be a not good circumstance for GPS reception. Regarding these examples, whether the circumstance of GPS reception is good or not may be determined from various pieces of information (such as geographical information and information of facilities) contained in map data.

According to this example, when the circumstance of GPS reception at the sample point $B_k$ is not good, that is, when the technology of estimating the subject vehicle position using the slope data is useful at the sample point $B_k$, $G_K$ is set to be a relatively large value. With this, strict evaluation is made on the slope error Δs in a location where the technology of estimating the subject vehicle position using the slope data is useful. As a result, an approximation formula capable of precisely calculating a slope value may be obtained.

Alternatively, the circumstantial information at the sample point $B_K$ is, for example, information whether the circumstance is suitable for the use of the map matching technology. For example, the map matching technology is suitable to be used in a place having a characteristic road shape and a place with a traffic sign. In contrast, for example, the map matching technology is difficult to be used in a long straight road without a traffic sign or the like.

In view of the above, when the circumstance at the sample point $B_k$ is not suitable for the use of the map matching technology, that is, when the technology of estimating the subject vehicle position using the slope data is useful at the sample point $B_k$, $G_K$ is set to be a relatively large value. With this, strict evaluation is made on the slope error Δs in a location where the technology of estimating the subject vehicle position using the slope data is useful. As a result, an approximation formula capable of precisely calculating a slope value may be obtained.

Note that, determination conditions of the circumstance of GPS reception are not limited to the above examples. Further, use of a plurality of determination conditions in combination allows more accurate determination of the circumstance of GPS reception. Further, the circumstance of GPS reception may be divided into three or more levels, and a value of $G_K$ may be set in accordance with the level. In other words, three or more types of values may be assigned for $G_K$. These modifications are also applicable for determination whether the circumstance is suitable for the use of the map matching technology.

Here, the term on the right side of the formula (16) represents an example of a slope error evaluation component for evaluating, at each of the sample points B, a slope error between a slope sample value and a slope model value that is calculated using the model formula. Further, $G_k$ represents an example of an active weight component for changing weight on the slope error in accordance with information concerning the sample point $B_k$. Here, the information concerning the sample point B is circumstantial information at the sample point B. That is, the slope error evaluation component of the formula (16) contains an active weight component. Employment of the active weight component allows increase in precision of approximation in a particular location or interval within the target route.

Further, employment of the approximation formula enables reduction in data volume, as compared to the case where data of slope values and altitude values at a large number of locations are stored. This allows increase in the compression rate of the map data.

The altitude error evaluation component may be added to the error evaluation formula Q of the formula (16). Refer to the formula (17) below. Note that, $\Sigma\Delta z^2$ in the formula (17) is defined in the formula (9) already described in the above.

[Formula 17]

$$Q = \sum_{k=b_i}^{b_f} (a1_k + b - s_k)^2 \times G_k + w\Sigma\Delta z^2 \quad (17)$$

In place of $w\Sigma\Delta z^2$ in the formula (17), $\Sigma\Delta z^2$ may be employed similarly to the formula (11).

When the error evaluation formula Q also contains the altitude error evaluation component, the effects similar to those of the first embodiment are obtained.

Here, according to the technology of estimating the subject vehicle position using the slope data, highly precise estimation is difficult under a circumstance where change in slope is scarce. That is, under such a circumstance, there is low necessity of using an approximation formula for the estimation of the subject vehicle position. Therefore, the approximation part 24 may generate an approximation formula only when the rate of change in slope in an interval to be approximated is equal to or more than a predetermined value.

Figure 9:
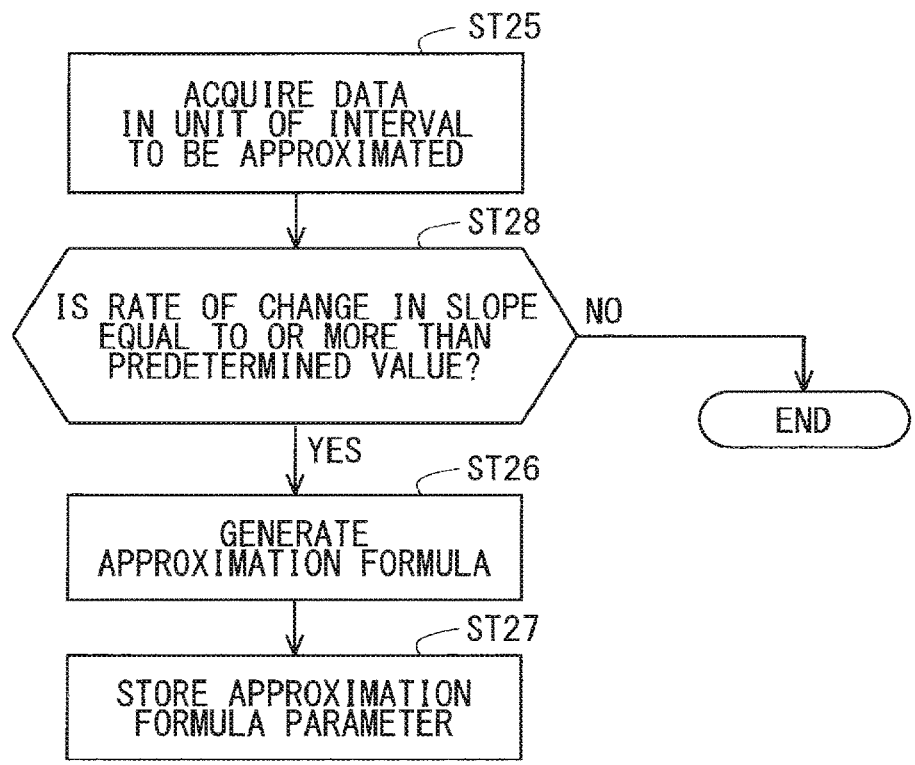
FIG. 9 is an operational sequence diagram of an approximation part.

In such a case, the operational sequence of the approximation part 24 of FIG. 8 is changed into the operational sequence as in FIG. 9. That is, Step ST28 is added subsequently to Step ST25, and the approximation part 24 determines in Step ST28 whether or not the rate of change in slope in an interval to be approximated is equal to or more than a predetermined value. As the rate of change in slope, for example, a value obtained by dividing a distribution width of slope sample values in an interval to be approximated by the length of the interval to be approximated is applicable. Further, as the above predetermined value, a value necessary for realizing estimation precision required for the estimation of the subject vehicle position is set.

When the rate of change in slope is equal to or more than a predetermined value, the approximation part 24 generates an approximation formula in Step ST26. In contrast, when the rate of change in slope is not equal to or more than the predetermined value, the approximation part 24 does not generate an approximation formula for the interval to be approximated.

According to this example, the number of approximation formulas is reduced, allowing reduction in data volume of approximation formula parameters. As a result, the compression rate of the map data is increased.

Incidentally, similarly to the second embodiment, the active weight may be applied to the route division as well. That is, the route divider 23 changes the width of the above predetermined range for evaluating the error between a provisional slope model value and a slope sample value in accordance with information concerning the sample point B. Here, the information concerning the sample point B is circumstantial information at the sample point B. Specifically, it is only necessary to change the value of ε in the above, which defines the width of the predetermined range, in accordance with the circumstantial information at the sample point B. Alternatively, ε may be multiplied by an active weight component, and the active weight component may be changed.

For example, the width of the above predetermined range is set to 0.01 radians when the circumstance of GPS reception is not good, and the width of the above predetermined range is set to 0.03 radians when the circumstance of GPS reception is good. This allows intervals with a not good circumstance of GPS reception to be finely divided, relatively shortening intervals to be approximated. As for such short intervals, highly precise approximation formulas may be obtained. In contrast, intervals with a good circumstance of GPS reception are more roughly divided, relatively reducing the number of intervals to be approximated. As a result, the number of approximation formulas, that is, data volume of approximation formula parameters, is reduced, allowing increase in the compression rate of the map data.

<Modifications Common to First to Third Embodiments>

The map data generation system 1 is capable of operation without the route divider 23. With the route divider 23, however, highly precise approximation formulas may be obtained. This is because the route divider 23 divides, in view of the type of an approximation formula (i.e., in view of the form of an approximate line), the target route so as not to include a sample point B that is likely to reduce the precision of the approximation formula.

Further, in the first to third embodiments, based on the hardware configuration diagram of FIG. 1, the functions of the data converter 22, the route divider 23, and the approximation part 24 are implemented by means of software. In contrast, the functions of the data converter 22, the route divider 23, and the approximation part 24 may be implemented by a dedicated processing circuit, i.e., by hardware.

Figure 10:
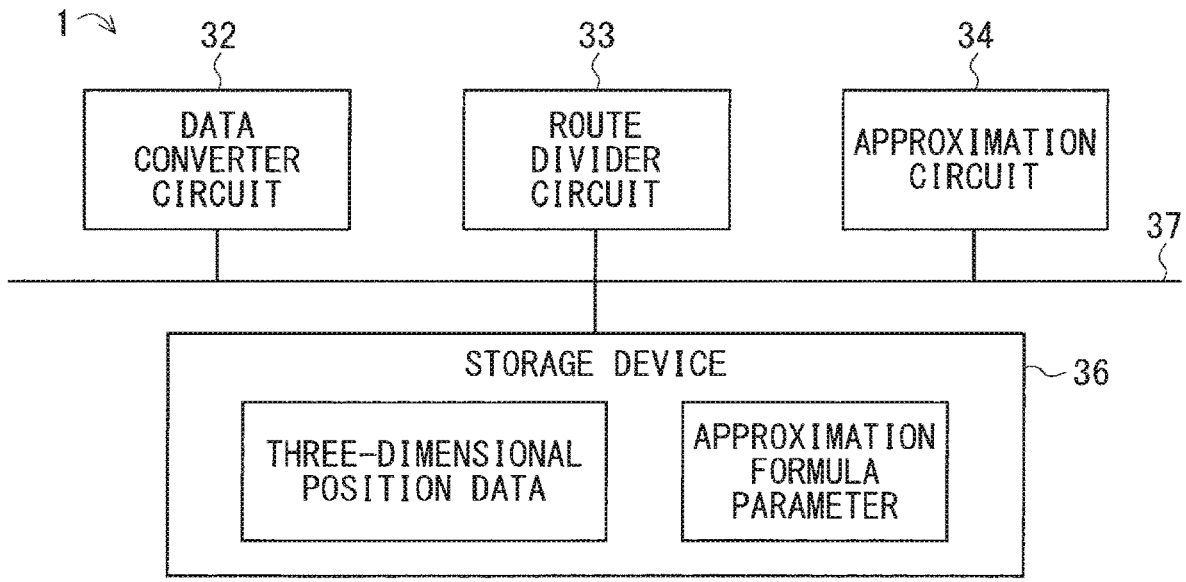
FIG. 10 is a hardware configuration diagram of the map data generation system according to modifications common to the first to third embodiments.

FIG. 10 is a hardware configuration diagram of such a case. In the map data generation system 1 of FIG. 10, a data converter circuit 32 is a processing circuit configured to implement the function of the data converter 22. Similarly, a route divider circuit 33 is a processing circuit configured to implement the function of the route divider 23, and an approximation circuit 34 is a processing circuit configured to implement the function of the approximation part 24. A storage device 36 stores three-dimensional position data of a sequence of shape forming points and an approximation formula parameter. Note that, these pieces of data may be stored in separate storage devices. The data converter circuit 32, the route divider circuit 33, the approximation circuit 34, and the storage device 36 are connected via a bus 37.

Here, according to the configuration of FIG. 1, three-dimensional position data of a sequence of shape forming points and an approximation formula parameter are transmitted via the bus 13. In contrast to this, one or both of these pieces of data may be stored in a server on a network. In such a case, the processor 11 accesses a server via a communication circuit (not shown) that is connected to the bus 13, and transmits and receives data. Further, the data converter 22, the route divider 23, and the approximation part 24 may be distributed on a network. These examples are also applicable for the configuration of FIG. 10.

Note that, in the present invention, each of the embodiments may be freely combined, and each of the embodiments may be modified or omitted as appropriate within the scope of the invention.

The present invention has been described in detail, but the above description is in all aspects illustrative, and the present invention is not limited thereto. It is understood that numerous unillustrated modifications are assumable without departing from the scope of the invention.

EXPLANATION OF REFERENCE SIGNS 1 map data generation system, 22 data converter, 23 route divider, 24 approximation part, A shape forming point, B sample point, Q error evaluation formula

The invention claimed is:

1. A map data generation system comprising:
circuitry configured to
calculate, based on three-dimensional position data of shape forming points representing a three-dimensional shape of a target route, a slope sample value indicating slope at a sample point on the target route and a distance sample value indicating a distance from a reference point on the target route to the sample point, wherein the sample point is one of a plurality of sample points, and wherein the slope sample value and the distance sample value are among a plurality of slope sample values and distance sample values obtained at the plurality of sample points; and
generate an approximation formula representing relation between the slope sample values and the distance sample values by determining undetermined elements contained in a model formula that is prepared for the approximation formula, wherein
the circuitry is configured to determine the undetermined elements such that an error evaluation result obtained by using an error evaluation formula that is defined concerning the model formula falls within an allowable range, and
the error evaluation formula comprises:
evaluating a slope error between the slope sample value and a slope model value that is calculated using the model formula;
evaluating an altitude error between an altitude model value that is obtained through integration of the slope model value and an altitude value that is obtained from the three-dimensional position data of the target route; and
adjusting weight so as to adjust precision of slope represented by the approximation formula and precision of altitude obtained through integration of the approximation formula.

2. The map data generation system according to claim 1, wherein the circuitry is further configured to
divide the target route into a plurality of divided routes so as to satisfy a predetermined requirement, wherein
the predetermined requirement is a requirement that, at all of sample points contained in a divided route, an error between a provisional slope model value that is obtained by substituting a corresponding one of the distance sample values into a provisional model formula and a corresponding one of the slope sample values falls within a predetermined range,
the provisional model formula is a formula in which the undetermined elements of the model formula are set such that the error becomes zero at the sample points at both ends contained in the divided route,
when the target route is divided, the circuitry is configured to generate the approximation formula for each of the plurality of divided routes, and
when the target route is not divided, the circuitry is configured to generate the approximation formula for the entire target route.

3. A map data generation system comprising:
circuitry configured to
calculate, based on three-dimensional position data of shape forming points representing a three-dimensional shape of a target route, a slope sample value indicating slope at a sample point on the target route and a distance sample value indicating a distance from a reference point on the target route to the sample point, wherein the sample point is one of a plurality of sample points, and wherein the slope sample value and the distance sample value are among a plurality of slope sample values and distance sample values obtained at the plurality of sample points; and
generate an approximation formula representing relation between the slope sample values and the distance sample values by determining undetermined elements contained in a model formula that is prepared for the approximation formula, wherein
the circuitry is configured to determine the undetermined elements such that an error evaluation result obtained by using an error evaluation formula that is defined concerning the model formula falls within an allowable range, and
the error evaluation formula comprises evaluating a slope error between the slope sample value and a slope model value that is calculated using the model formula, and changing weight on the slope error in accordance with a slope value range being a possible range of a slope value at the sample point.

4. The map data generation system according to claim 3, wherein,
the circuitry is configured to generate the approximation formula only when a rate of change in slope is equal to or more than a predetermined value.

5. The map data generation system according to claim 3, wherein,
the error evaluation formula further comprises evaluating an altitude error between an altitude model value that is obtained through integration of the slope model value and an altitude value that is obtained from the three-dimensional position data of the target route.

6. The map data generation system according to claim 5, wherein,
the error evaluation formula further comprises adjusting proportion of influence of the slope error evaluation and the altitude error evaluation over the error evaluation result.

7. The map data generation system according to claim 3, wherein the circuitry is further configured to
divide the target route into a plurality of divided routes so as to satisfy a predetermined requirement, wherein
the predetermined requirement is a requirement that, at all of sample points contained in a divided route, an error between a provisional slope model value that is obtained by substituting a corresponding one of the distance sample values into a provisional model formula and a corresponding one of the slope sample values falls within a predetermined range,
the provisional model formula is a formula in which the undetermined elements of the model formula are set such that the error becomes zero at the sample points at both ends contained in the divided route,
when the target route is divided, the circuitry is configured to generate the approximation formula for each of the plurality of divided routes, and
when the target route is not divided, the circuitry is configured to generate the approximation formula for the entire target route.

8. The map data generation system according to claim 7, wherein, the circuitry is configured to change width of the predetermined range in accordance with the slope value range.

9. A method for generating map data comprising:

calculating, using circuitry, based on three-dimensional position data of shape forming points representing a three-dimensional shape of a target route, a slope sample value indicating slope at a sample point on the target route and a distance sample value indicating a distance from a reference point on the target route to the sample point, wherein the sample point is one of a plurality of sample points, and wherein the slope sample value and the distance sample value are among a plurality of slope sample values and distance sample values obtained at the plurality of sample points; and generating, using the circuitry, an approximation formula representing relation between the slope sample values and the distance sample values by determining undetermined elements contained in a model formula that is prepared for the approximation formula, wherein in the generating, the undetermined elements are determined such that an error evaluation result obtained by using an error evaluation formula that is defined concerning the model formula falls within an allowable range, and the error evaluation formula comprises:

evaluating a slope error between the slope sample value and a slope model value that is calculated using the model formula;

evaluating an altitude error between an altitude model value that is obtained through integration of the slope model value and an altitude value that is obtained from the three-dimensional position data of the target route; and adjusting weight so as to adjust precision of slope represented by the approximation formula and precision of altitude obtained through integration of the approximation formula.

* * * * *